350-376 SR SEARCH ROOM
CROSS REFERENCE
XR 3,516,747
TX 4029D

June 23, 1970 G. H. MOORE 3,516,747

FIELD MODULATION METHOD FOR OBSERVING ULTRA-HIGH-SPEED FERROMAGNETIC DOMAIN DYNAMICS

Filed June 12, 1968

GEORGE H. MOORE
INVENTOR.

BY J. M. St. Amand
ATTORNEY

3516747
OR IN 356/366

3,516,747
FIELD MODULATION METHOD FOR OBSERVING ULTRA-HIGH-SPEED FERROMAGNETIC DOMAIN DYNAMICS

George H. Moore, Corona, Calif., assignor to the United States of America as represented by the Secretary of the Navy Filed June 12, 1968, Ser. No. 736,430
Int. Cl. G01n *21/40;* G02f *1/26*
U.S. Cl. 356—115 8 Claims

ABSTRACT OF THE DISCLOSURE

A field modulation method which makes possible visual observations and photographic studies of magnetic domain reversal dynamics that occur in the nanosecond time spectrum by subjecting a thin ferromagnetic film to an increasing magnetic field in one direction at a low or "scanning" frequency and returning to saturation magnetization in the opposite direction at very high frequency; the low frequency in effect "scanning" the reversal dynamics of the higher frequency, permitting observations to be made of the reversal process when viewed magneto-optically.

The invention herein described may be manufactured and used by or for the Government of the United States of America for governmental purposes without the payment of any royalties thereon or thereafter.

The observation by optical means of the process of magnetization reversal is important for several reasons: To make possible visual observations and photographic studies of the nucleation and movement of magnetic domain boundaries that occur at very high frequencies; to provide information directly of the physical process by which the magnetization changes; it can lead to magneto-optic device applications, such as non-destructive readout from stored information on suitable magnetic tape or disc; for magneto-optic investigations using shuttering or modulation techniques for processing information at extremely high rates. This information can be then transmitted along an optical beam.

The use of the longitudinal Kerr effect for statically observing ferromagnetic domains has been demonstrated by C. A. Fowler, Jr., and E. M. Fryer, "Magnetic Domains by the Longitudinal Kerr Effect," Phys. Rev., vol. 94, pp. 52–56 (1954). An apparatus has been constructed which extends and improves the techniques to the point where domain configurations are easily visible to the naked eye and can be observed to move under the influence of a varying magnetic field. Experiments can be performed with soft magnetic materials of almost arbitrary thickness. Evaporated films of 80% Ni, 20% Fe, Permalloy, and various Perminvar (Fe, Ni, Co) compositions of the order of 2000 A. in the thickness have been employed in measurements as part of a study of thin films for possible application in computer coincident current memories. The development of this dynamic, magneto-optic technique allows the direct viewing of the nucleation and movement of domain boundaries, and thus greatly enhances understanding of magnetic phenomena.

The present invention provides a new, simple and less expensive method to observe magnetization reversal at ultra-high rates of speed by employing field modulation instead of the conventional modes of stroboscopy with their inherent ultra-high-speed limitations. The field modulation method has no such limitations; thus, the speed of reversal can be extended into the nano-second range with comparative ease, and is limited only by how fast the specimen of ferromagnetic material under observation is capable of being reversed.

This invention comprises a light source emitting a beam which passes through a collimating lens and a polarizer to reflect from ferromagnetic film into an analyzer where the magnetic domain pattern can be observed. A strong magnetic field from a coil reverses the direction of magnetization of the film. As polarity reversal of the film occurs, a field coil superimposes slowly changing magnetic field on the high frequency field coil to create an amplitude modulated field. The relation of the amplitudes of the two frequencies determines at what point in the thin-film reversal cycle the various stages of magnetic domain reversal dynamics are observed.

The field modulation method of this invention scans the driving magnetic field in respect to a slowly changing magnetic field superimposed upon the driving field (a form of modulation) whereas the relation of the amplitudes of the two frequencies determines at what point in the thin-film reversal cycle the various stages of magnetic domain reversal dynamics are observed. The thin ferromagnetic film is subjected to an increasing magnetic field in one direction at a low frequency and returned to saturation magnetization in the opposite direction at a very high frequency. The low frequency in effect scans the reversal dynamics of the high frequency, and these very fast events are displayed in slow motion even though they take place at extremely high rates of speed.

Other objects and many of the attendant advantages of this invention will become readily appreciated as the same becomes better understood by reference to the following detailed description when considered in connection with the accompanying drawings wherein.

When two different frequencies are present at the same time in an ordinary circuit (i.e., one in which Ohm's law holds) each behaves as though the other were not there. It is true that the total, or resultant, voltage (or current) in the circuit will be the sum of the instantaneous values of the two at every instant. This is because there can be only one value of current or voltage at any single point in a circuit at any instant (e.g. in FIG. 4, $H_1$ and $H_2$ are two such frequencies and $H_1+H_2$ is the resultant). The amplitude of the high frequency field is not affected by the presence of the very low, e.g. 1 c.p.s. current, but merely has its axis shifted back and forth at the low frequency rate, which in effect scans the high frequency field, thereby producing a low frequency optical scan of the thin-film reversal cycle as seen by the magneto-optic apparatus.

If a non-linear element has two different frequencies applied to it then sum and difference frequencies are produced in consequence. The magnetic film is such a non-linear element. If two different frequency magnetic fields are applied to a magnetic film, then the film produces electrically sum and difference frequencies.

However, if the process of magnetization reversal is observed optically, i.e. by the interaction between plane-polarized light and the film magnetization, then sum and difference frequencies appear in the optical output signal as well as in the electrical signal. This is the basis of the magnetooptic field modulation method.

The sum and difference frequencies created when a low frequency controls the amplitude of a higher frequency (amplitude modulation) or when a high frequency is used to modulate another high frequency (heterodyning) or other forms of modulation such as frequency modulation, pulse modulation, beat frequency modulation or superimposed A.C. on D.C. may be used in varying modes to make visible the ferromagnetic domain dynamics that occur during the "switching" or reversal cycle when used in conjunction with the magneto-optic apparatus subsequently described.

Figure 1:
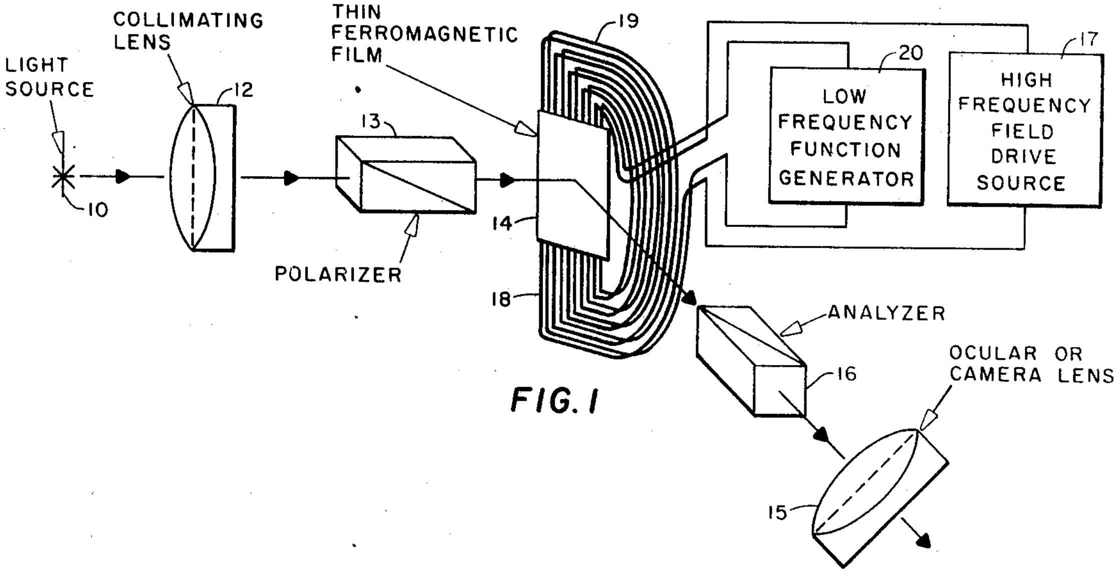
FIG. 1 is a diagrammatic illustration of a preferred embodiment of the invention for field modulation for observing high-speed ferromagnetic domain dynamics.

As illustrated in FIG. 1, light from an intense source 10 passes through collimating lens 12 and a Glan-Thompson (calcite) polarizer 13 to reflect from ferromagnetic film 14 at an optimum angle into a nearly crossed Glan-Thompson analyzer 16. The magnetic domain patterns of the film 14 can be observed at this point via an occular or camera lens 15. The high frequency drive source 17, drives coil 18 which supplies a strong magnetic field to reverse the direction of magnetization of ferromagnetic film 14. Therefore, the magnetization of film 14 is cycled at the frequency or repetition rate of the high frequency drive source 17. As reversal of polarity of the ferromagnetic film occurs, a slowly changing magnetic field is superimposed by field coil 19 on the high frequency field coil 18 creating a slowly changing, modulating field, due to the interaction of the high frequency and slowly changing low frequency. The relation of the amplitudes of these frequencies determines at what point in time of the reversal cycle the dynamics of domain reversal action is observed. The magnetization can be made to change over a fraction of each cycle. The above description is predicated on a sine wave function, although any wave form from the high frequency field drive source 17 is observable.

Figures 2, 3, 4:
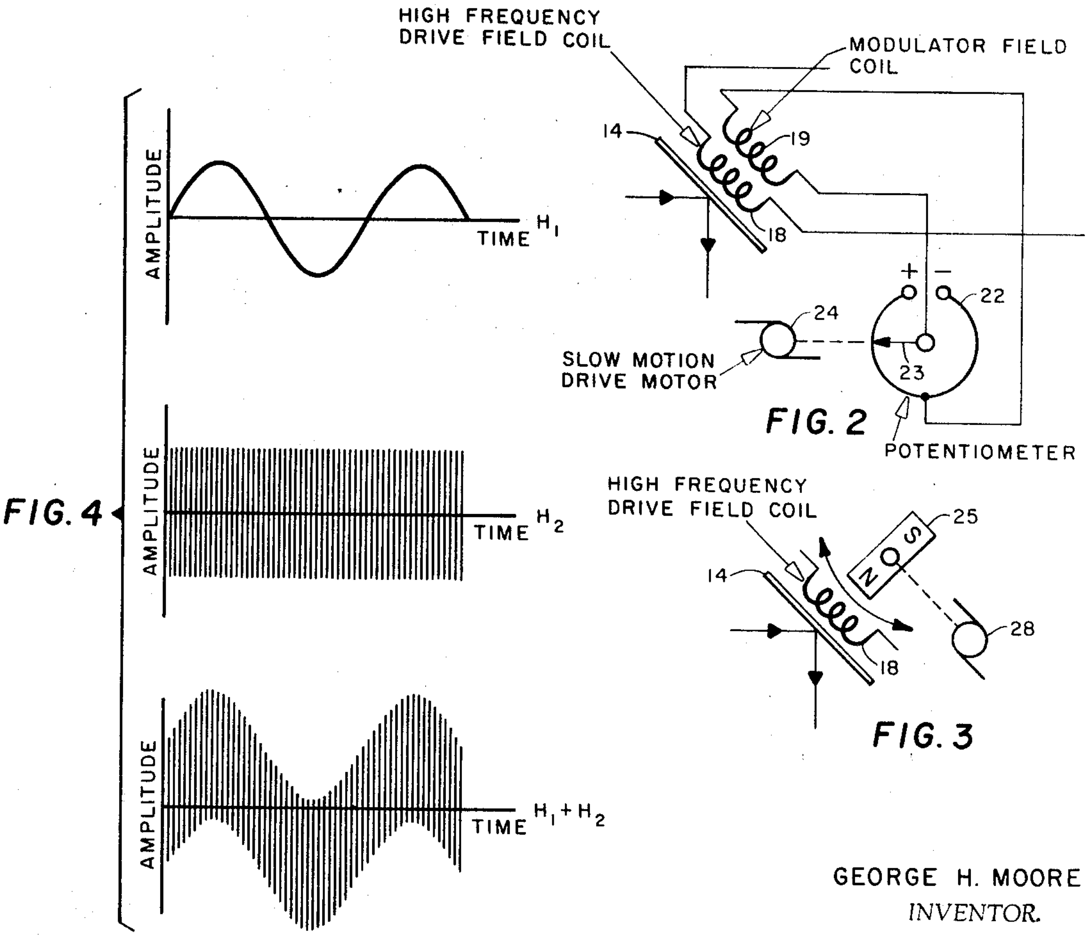
FIG. 2 is an alternate embodiment of the invention.
FIG. 3 shows another embodiment of the invention.
FIG. 4 illustrates high, low and resultant magnetic fields.

Further consider the system shown in FIG. 1. The field coils 18 and 19 consist of spiral coplaner windings which constitute in effect a modulation transformer. The magnetic field generated by the high frequency source 17 in coil 18 is modulated by the field generated by source 20 in coil 19. Assuming that the high frequency field is $H_2$ and the low frequency field is $H_1$ in the same figure, then the magnetic field acting on a magnetic film of 80–20 Ni-Fe, for example, superposed on the drive coils is $H_1+H_2$ as shown in FIG. 4. If the phase of $H_2$ changes slowly in time with respect to $H_1$, then $H_1$ is phase modulated. The magnetization change, including nucleation, wall motion, and reversal of domains depends on the magnitude of the total field. The low frequency field must be so adjusted in amplitude that it alone cannot "switch" the thin-film.

Because the resultant magnetic field $(H_1+H_2)$ is phase modulated in time, and the sequence scanned magneto-optically, by the apparatus shown in FIG. 1, the magnetic domain patterns (image) appear as a sequence of events which are in effect reconstituted by this scanning process.

In order for an image to be formed in a significant manner, the amplitude and frequency of the high-frequency domain reversal field must remain stable relative to the slowly changing modulation field. If this condition is met there is no significant difference in the end results, image-wise, between the optical strobing technique or the field modulation method, as experimental results have proved.

In contrast to other systems, the Field Modulation Method of this invention is a "continuous writing" or "continuous scanning," self-synchronizing system that eliminates many of the major problems heretofore encountered in observing and photographing magnetic domain reversal dynamics, viz, synchronization difficulties, repetition rate limitations, light requirements, etc. The problem of a very high intensity light source is minimized and the need of such intense sources as laser beam, concentrated sunlight, mercury arc, and xenon has been eliminated by utilizing the field modulation method.

As illustrated in FIG. 2, voltage is generated to drive modulator field coil 19 by the use of a center tapped 360° potentiometer 22 connected across a D.C. supply. The potentiometer arm 23 is slowly rotated at a speed of 1-cycle per second, or less, by a constant speed motor 24. Thus, by connecting this rotating arm 23 and center tap from potentiometer 22 to the modulator field coil 19, a slowly varying voltage is generated and is superimposed on the high frequency drive coil 18 producing the modulation effects described above.

Another way of producing a similar modulating field is illustrated in FIG. 3 where a permanent bar or electromagnet 25 is slowly rotated by a constant speed motor 28 in proximity to the high frequency field drive coil 18.

Experimental results have confirmed the utilization of this new technique to extend the dimensions of magnetic domain observation and photography into the ultra-high-speed time spectrum, with the following advantages over conventional stroboscopic, or other methods: repetition rate of reversal is extended into the nanosecond range; the display time magnification ratio is unlimited; this system has fractional light requirements relative to other high-speed techniques; the elimination of a rotating mirror system and other "strobing" or "shuttering" devices; relatively low cost; simplicity of operation; self-synchronizing; and, shorter photographic exposure time requirements.

Observation of magnetic domains inherently occurs at a comparatively low light level because of the fact that magnetic domains are only visible very near the point of extinction of the polarizing system employed. This factor may reduce the available light level to a ratio of more than 100,000 to 1. The amount of usable light is also limited by the heat factor of a high intensity source relative to the heat limitations of the polarizing system involved; therefore, the continuous scanning, self-synchronizing field modulation method of the present invention is a major breakthrough in magnetic domain technology in order to observe and photograph nanosecond magnetic domain dynamics in slow motion, at low light levels.

Obviously many modifications and variations of the present invention are possible in the light of the above teachings. It is therefore to be understood that within the scope of the appended claims the invention may be practiced otherwise than as specifically described.

What is claimed is:

1. Magneto-optic apparatus for observing high-speed ferromagnetic domain dynamics, comprising:

(a) a high intensity light source,
(b) light collimating means,
(c) light polarizer means,
(d) a ferromagnetic film to be analyzed,
(e) a high frequency magnetic field driving means for applying a high frequency magnetic field to said ferromagnetic film for cycling the direction of magnetization of said film at the repetition rate of said high frequency,
(f) a magnetic field modulator means for also applying a modulating frequency magnetic field to said ferromagnetic film, said field modulator means superimposing a different frequency magnetic field on the magnetic field of said high frequency magnetic field driving means to create a changing modulating field due to the interaction of the two different magnetic fields, the two different magnetic fields causing sum and difference frequencies to be produced in the ferromagnetic film,
(g) light analyzer means, light from said source passing through said collimating means and said polarizer means to reflect from the surface of said ferromagnetic film into said light analyzer means where the process of magnetization reversal can be observed at the analyzer output as sum and difference frequencies by the interaction between plane-polarized light and magnetization of the ferromagnetic film.

2. Apparatus as in claim 1 wherein said polarizer means and said analyzer means are Glan-Thompson prisms.

3. Apparatus as in claim 1 wherein said high frequency magnetic field driving means is a field coil driven by a high frequency source.

4. Apparatus as in claim 1 wherein said magnetic field modulator means is a field coil driven by a low frequency function generator.

5. Apparatus as in claim 1 wherein said magnetic field modulator is a field coil connected between the center tap and rotating arm of a potentiometer connected across a D.C. source, the arm of the potentiometer being rotated slowly to slowly vary the voltage across said modulator coil.

6. Apparatus as in claim 1 wherein said magnetic field modulator is a permanent magnet which is slowly rotated in proximity to said high frequency magnetic field driving means to modulate said high frequency magnetic field.

7. Apparatus as in claim 1 wherein said high frequency magnetic field driving means and said magnetic field modulator means consist of a pair of spiral coplanar windings which constitute in effect a modulation transformer, each of said pair of windings being individually driven by respective frequency sources.

8. Apparatus as in claim 1 wherein ocular means is provided at the output of said analyzer means for readily observing or photographing the dynamics of magnetic domain reversal action.

References Cited

UNITED STATES PATENTS

| | | |
|---|---|---|
| 3,150,356 | 9/1964 | Newman. |
| 3,422,269 | 1/1969 | Di Chen. |

OTHER REFERENCES

Feldtkeller, "Ripple Hysteresis in Thin Magnetic Films," J. Applied Physics, vol. 34, No. 9, pp. 2646–2652, September 1963.

Dillon et al., "Visual Observation of Magnetostatic Modes," Appl. Physics Letters, vol. 2, No. 2, pp. 38–39, January 1963.

Archibald et al., "High Speed Magnetooptical Measurements on Film," Rev. Sci. Instr., vol. 31, No. 6, pp. 653–655, June 1960.

Prutton, The Ferromagnetic Films, 1964, pp. 132–176.

RONALD L. WIBERT, Primary Examiner

J. ROTHENBERG, Assistant Examiner

U.S. Cl. X.R.

350—151; 356—118